United States Patent
Ebara et al.

(10) Patent No.: US 11,836,391 B2
(45) Date of Patent: Dec. 5, 2023

(54) DISTRIBUTED STORAGE SYSTEM AND STORAGE CONTROL METHOD

(71) Applicant: Hitachi, Ltd., Tokyo (JP)

(72) Inventors: Hiroto Ebara, Tokyo (JP); Akira Yamamoto, Tokyo (JP); Yoshinori Ohira, Tokyo (JP); Masakuni Agetsuma, Tokyo (JP); Makio Mizuno, Tokyo (JP); Takahiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/692,269

(22) Filed: Mar. 11, 2022

(65) Prior Publication Data

US 2023/0135652 A1 May 4, 2023

(30) Foreign Application Priority Data

Oct. 28, 2021 (JP) .................................. 2021-176767

(51) Int. Cl.
*G06F 3/06* (2006.01)

(52) U.S. Cl.
CPC ............ *G06F 3/067* (2013.01); *G06F 3/0604* (2013.01); *G06F 3/0655* (2013.01)

(58) Field of Classification Search
None
See application file for complete search history.

(56) References Cited

U.S. PATENT DOCUMENTS

| | | | |
|---|---|---|---|
| 7,562,250 B2 * | 7/2009 | Wahl .................. | G06F 11/2074 711/162 |
| 2012/0260034 A1 * | 10/2012 | Primadani .......... | G06F 11/1076 711/E12.019 |
| 2015/0127854 A1 | 5/2015 | Yamamoto | |
| 2016/0117127 A1 | 4/2016 | Yamamoto | |
| 2020/0210082 A1 | 7/2020 | Yamamoto | |
| 2020/0210083 A1 | 7/2020 | Yamamoto | |
| 2021/0263659 A1 | 8/2021 | Yamamoto | |

FOREIGN PATENT DOCUMENTS

| CN | 109582219 A | * | 4/2019 | .......... G06F 11/1068 |
|---|---|---|---|---|
| JP | 6114397 B2 | | 4/2017 | |

* cited by examiner

*Primary Examiner* — Brian R Peugh
(74) *Attorney, Agent, or Firm* — Volpe Koenig

(57) ABSTRACT

A distributed storage system includes one or a plurality of storage units including a plurality of physical storage devices, and a plurality of computers connected to the one or plurality of storage units via a communication network. When receiving a write request for a logical volume, the computer writes write data corresponding to the write request and redundant data for making the write data redundant in a plurality of physical storage devices of the storage unit in a distributed manner, and collectively controls writing of a journal of write data for managing a write history of the write data and a journal of redundant data for managing a write history of the redundant data.

6 Claims, 14 Drawing Sheets

| | |
|---|---|
| VOLUME ID | ~1401 |
| STORAGE CONTROLLER ID | ~1402 |
| SERVER ID | ~1403 |
| DATA PROTECTION SETTING | ~1404 |
| MAPPING LIST | ~1405 |

| | |
|---|---|
| MAPPING ID | ~1501 |
| TUPLE | ~1502 |
| TUPLE LIST | ~1503 |
| LOCK STATUS | ~1504 |

| | |
|---|---|
| JOURNAL ID | ~1601 |
| STATUS | ~1602 |
| TUPLE | ~1603 |
| MAPPING ID | ~1604 |
| DATA LIST | ~1605 |
| LINK JOURNAL LIST | ~1606 |
| COMMIT FLAG | ~1607 |

DISTRIBUTED STORAGE SYSTEM AND STORAGE CONTROL METHOD

BACKGROUND OF THE INVENTION

1. Field of the Invention

The present invention relates to a distributed storage system and a storage control method.

2. Description of the Related Art

Conventionally, since a plurality of storage systems shares a storage box having a storage device, there is a technique described in JP 6114397 B2.

JP 6114397 B2 describes that "A composite storage system comprising: one or more storage boxes having a plurality of storage devices; and one or more storage systems that are connected to the one or more storage boxes, receive an I/O (Input/Output) command for designating an I/O destination from a host device, and process the I/O command, wherein when a configuration change in which a control right for a storage area is set to any one of the one or more storage systems, and the number of the storage boxes for the number of the storage systems is relatively changed is performed, in response to transmission of information from a first storage system that is a storage system that causes the configuration change, at least one control right is moved between a second storage system that is any one of the storage systems existing after the configuration change and the first storage system, the control right is an authority to process an I/O command with a storage area corresponding to the control right as an I/O destination, and write data to the storage area is stored in any of the plurality of storage devices".

SUMMARY OF THE INVENTION

Conventional techniques insufficiently reduce network load. For example, in a case where data is redundantly stored in a plurality of storage devices, a network load is also generated in each of writing of a journal of original data and writing of a journal of redundant data. Since such a network load can be a bottleneck of performance of a storage system, how to reduce the network load has been an important issue.

Therefore, an object of the present invention is to reduce a network load in a storage system.

In order to achieve the above object, a representative distributed storage system of the present invention includes, one or a plurality of storage units including a plurality of physical storage devices, and a plurality of computers connected to the one or plurality of storage units via a communication network. When receiving a write request for a logical volume, the computer writes write data corresponding to the write request and redundant data for making the write data redundant in a plurality of physical storage devices of the storage unit in a distributed manner, and collectively controls writing of a journal of write data for managing a write history of the write data and a journal of redundant data for managing a write history of the redundant data.

In addition, one of the representative storage control methods of the present invention causes a computer, which is connected to one or a plurality of storage units including a plurality of physical storage devices via a communication network, to execute: writing, when receiving a write request for a logical volume, write data corresponding to the write request in the plurality of physical storage devices of the storage unit in a distributed manner; and collectively controlling writing of a journal of write data for managing a write history of the write data and a journal of redundant data for managing a write history of the redundant data.

According to the present invention, a network load in a storage system can be reduced. Objects, configurations, and effects besides the above description will be apparent through the explanation on the following embodiments.

BRIEF DESCRIPTION OF THE DRAWINGS

FIG. 14 is an explanatory diagram of a volume table;

FIG. 15 is an explanatory diagram of a mapping table;

FIG. 16 is an explanatory diagram of a journal table;

DESCRIPTION OF THE PREFERRED EMBODIMENTS

Figure 1:
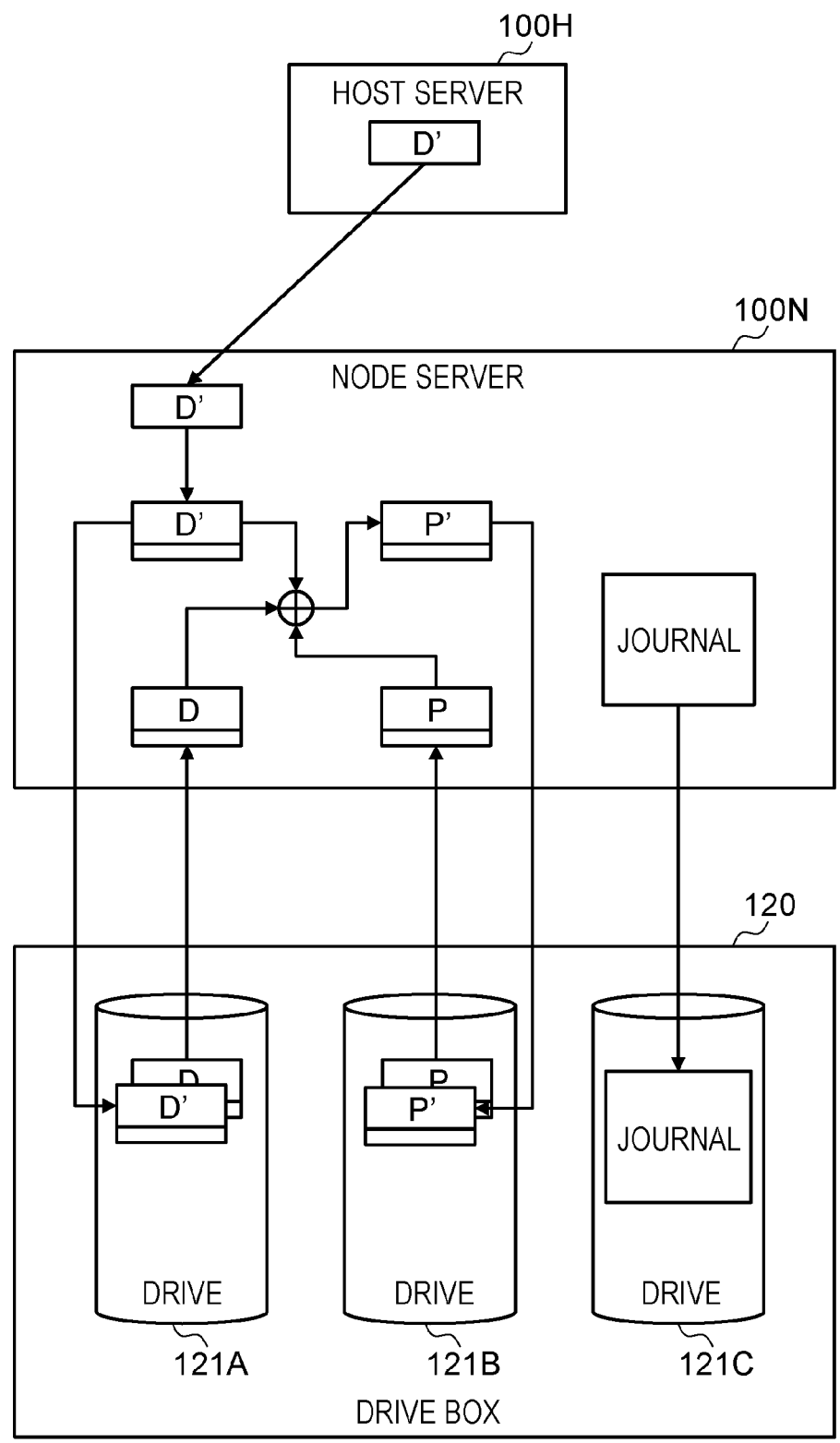
FIG. 1 is a diagram illustrating an outline of a distributed storage system according to an embodiment of the present invention.

In the following description, a "communication interface device" may represent one or more communication interface devices. The one or more communication interface devices may be one or more communication interface devices of the same type (for example, one or more Network Interface Cards (NICs)), or may be two or more communication interface devices of different types (for example, NIC and Host Bus Adapter (HBA)).

Further, in the following description, a "memory" is one or more memory devices that are examples of one or more storage devices, and may typically be a main memory device. At least one memory device in the memory may be a volatile memory device or a non-volatile memory device.

In the following description, a "storage unit" is an example of a unit including one or more physical storage devices. The physical storage device may be a persistent storage device. The persistent storage device may typically be a non-volatile storage device (for example, auxiliary storage device), and specifically, for example, a Hard Disk Drive (HDD), a Solid State Drive (SSD), a Non-Volatile Memory Express (NVMe) drive or a Storage Class Memory (SCM) may be used. In the following description, a "drive box" is an example of a storage unit, and a "drive" is an example of a physical storage device.

Further, in the following description, a "processor" may be one or more processor devices. At least one processor device is typically a microprocessor device such as a Central Processing Unit (CPU), or may be other types of processor devices such as a Graphics Processing Unit (GPU). At least one processor device may be configured by a single core, or multiple cores. At least one processor device may be a processor core. At least one processor device may be a processor device such as a circuit that is a collection of gate arrays in a hardware description language (for example, Field-Programmable Gate Array (FPGA), Complex Programmable Logic Device (CPLD), or an Application Specific Integrated Circuit (ASIC)) which performs some or all of the processes in a broad sense.

In addition, in the following description, information that can be output for an input may be described in terms of expressions such as "xxx table". The information may be any structured data (for example, structured data or unstructured data), or may be a learning model represented by a neural network that generates an output to an input, a genetic algorithm, or a random forest. Therefore, the "xxx table" can be called "xxx information". In addition, in the following description, the configuration of each table is given as merely exemplary. One table may be divided into two or more tables, or all or some of two or more tables may be configured by one table.

In the following description, there is a case where processing is described with a "program" as a subject, but the subject of the processing may be a processor (alternatively, a device such as a controller having the processor) since the program is executed by the processor to perform defined processing appropriately using a memory and/or a communication interface device. The program may be installed on a device such as a computer from a program source. The program source may be, for example, a program distribution server or a computer-readable (for example, non-transitory) recording medium. In addition, in the following description, two or more programs may be expressed as one program, or one program may be expressed as two or more programs.

In addition, in the following description, in a case where similar types of elements are described without distinction, the common symbol among the reference symbols (or reference symbol) may be used. In a case where the similar types of elements are distinguished, the reference symbols of the elements (or the identifiers of the elements) may be used.

FIG. 1 is a diagram illustrating an outline of a distributed storage system according to an embodiment of the present invention.

The distributed storage system in the present embodiment includes one or a plurality of drive boxes 120, a plurality of node servers 100N, and one or a plurality of host servers 100H.

The drive box 120 is a storage unit including a plurality of drives 121 as physical storage devices.

The node server 100N is a computer connected to the drive box 120 via a communication network.

The node server 100N allocates the plurality of drives 121 to logical volumes, and provides the logical volumes to the host server 100H. A plurality of drives is allocated to the logical volume, and data redundancy is performed by generating redundant data for redundancy from a plurality of pieces of write data and storing the data in separate drives. When receiving a write request for the logical volume from the host server 100H, the node server 100N obtains write authority for the drive 121 for both the write data corresponding to the write request and the redundant data for making the write data redundant, and writes the write data in the plurality of drives 121 in a distributed manner. In addition, the node server 100N collectively controls writing of a journal of write data for managing a write history of the write data and a journal of redundant data for managing a write history of the redundant data.

In addition, the node server 100N generates a guarantee code for confirming that the write data is not changed until the write data is read, and writes the write data and the corresponding guarantee code in a continuous area in the drive 121. Similarly, the node server 100N generates a guarantee code for confirming that the redundant data is not changed until the redundant data is read, and writes the redundant data and the corresponding guarantee code in a continuous area in the drive 121. For example, a data integrity field (DIF) may be used as the guarantee code.

In FIG. 1, the drive box 120 includes a drive 121A, a drive 121B, and a drive 121C. The drive 121A is used for writing write data, and the drive 121B is used for writing parity that is redundant data. In addition, the journal of the write data and the journal of the redundant data are written in the drive 121C.

A process of rewriting data D to data D' from a state in which the data D with the guarantee code is written in the drive 121 and a parity P of the data D with the guarantee code is written in the drive 121B will be described.

First, the host server 100H makes a write request for writing the data D' to the address where the data D is stored, that is, a write request using the data D' as write data.

Upon receiving the write request with the data D' as write data, the node server 100N adds a guarantee code to the data D', reads the data D with the guarantee code from the drive 121A, and reads the parity P with the guarantee code from the drive 121B. The node server 100N obtains a parity P' from the data D, the parity P, and the data D', and adds the guarantee code to the parity P'.

Thereafter, the node server 100N rewrites the data D of the drive 121A into the data D', and at the same time, writes the guarantee code in a continuous area. Similarly, the node server 100N writes the guarantee code in a continuous area at the same time as rewriting the parity P of the drive 121B to the parity P'. Further, the journal of writing the data D' and the parity P' is stored in the drive 121C.

As described above, since the node server 100N is connected to the drive box 120 including the plurality of drives 121 via a network, the processing capacity of the node server 100N and the capacity of the drive 121 can be scaled independently.

In the configuration in which the node server 100N and the drive are integrated, the drive becomes unusable when the node server 100N fails. Therefore, the drive to which the write data is written and the drive to which the redundant data is written are under the control of another node server 100N, and the write authority for the write data and the write authority for the redundant data are possessed by each node server 100N. In such a configuration, communication is required between the node servers 100N, and the journal of the write data and the journal of the redundant data also need to be written individually.

On the other hand, in the configuration illustrated in FIG. 1, in principle, one node server 100N writes both the write data and the journal of the redundant data, so that communication is unnecessary among the plurality of node servers 100N. In addition, since the journals of the write data and the redundant data can be collectively written, the network load can be reduced. By collectively writing the journals of the write data and the redundant data, the other node server 100N can grasp the latest write state from the information stored in the storage unit, and in a case where a failure occurs in the node server 100N in charge of writing, the other node server 100N can read the write data, the redundant data, the journal of the write data, and the journal of the redundant data and take over its role (in charge of data input/output to/from the logical volume). Note that, in the present embodiment, a write-through method is adopted, and it may be considered that all the write data and the like related to the write completion are completely stored in the storage unit when the write completion is responded to the host.

In addition, in the configuration illustrated in FIG. 1, when the guarantee code is assigned to the write data and the parity, the write data and the guarantee code corresponding to the parity are arranged continuously, and I/O processing of the data and the parity is executed. As a result, the I/O processing of the guarantee code corresponding to the write data and the parity can be executed at a time, and the number of I/Os can be reduced.

Figure 2:
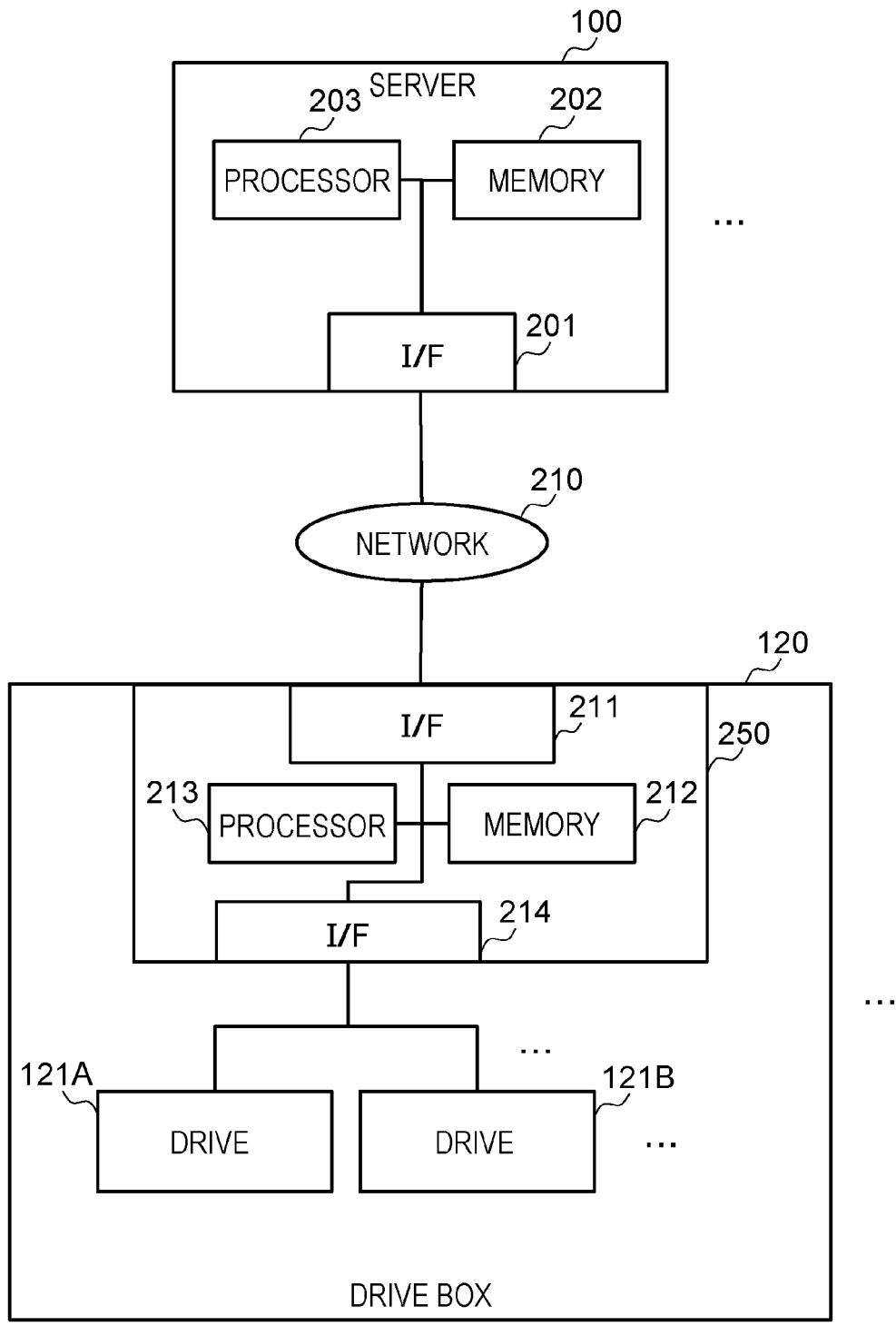
FIG. 2 is a configuration diagram for explaining a configuration of a server and a drive box.

FIG. 2 is a configuration diagram for explaining the configuration of a server and a drive box. A server 100 includes an interface (I/F) 201, a memory 202, and a processor 203.

The interface 201 is a communication interface device that communicates with the drive box 120 via a network 210.

The processor 203 develops and executes a predetermined program in the memory 202 to cause the server 100 to operate as the host server 100H or the node server 100N. That is, the server 100 on which an application has been executed becomes the host server 100H, and the server 100 on which the storage controller has been executed becomes the node server 100N.

The network 210 is a network switch or the like that interconnects the server 100 and the drive box 120.

The drive box 120 is a server specialized for bundling and controlling physical storage devices, and includes the plurality of drives 121 and a controller unit 250. The controller unit 250 includes an interface (I/F) 211, a memory 212, a processor 213, and an interface (I/F) 214.

The interface 211 is a communication interface device that communicates with the server 100 via the network 210.

The processor 213 develops and executes a predetermined program in the memory 212 to execute control of the storage device. Specifically, the processor 213 processes read and write to the drive 121 in accordance with a request from the node server 100N.

The interface 214 is a communication interface device that communicates with the plurality of drives 121.

Figure 3:
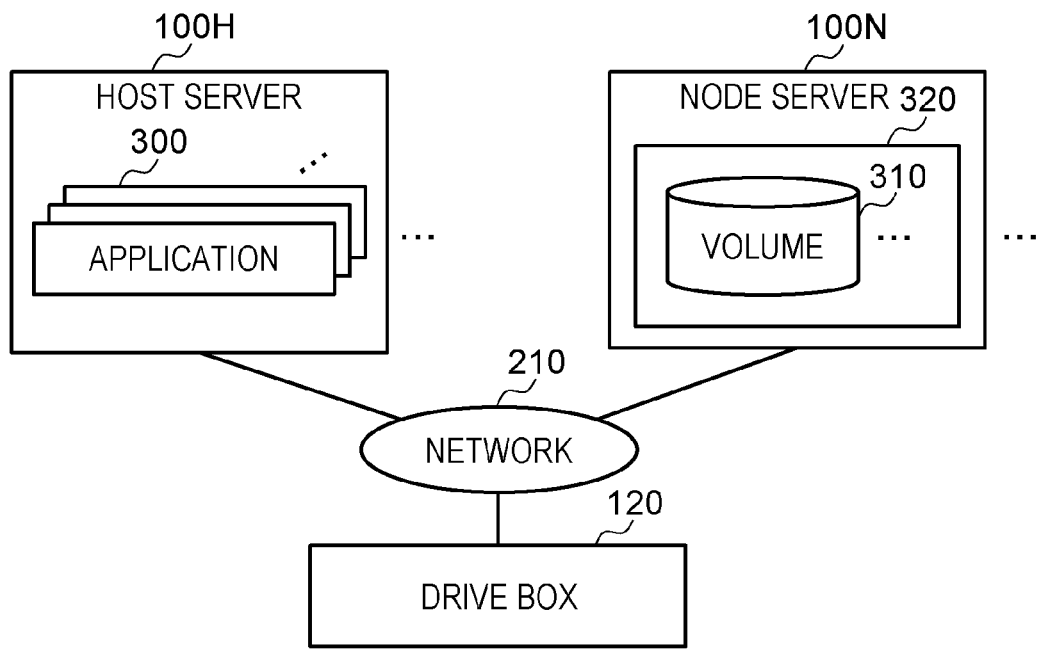
FIG. 3 is a configuration diagram for explaining a system configuration of the distributed storage system.

FIG. 3 is a configuration diagram for explaining a system configuration of the distributed storage system. As illustrated in FIG. 3, one or the plurality of host servers 100H, one or the plurality of node servers 100N, and one or the plurality of drive boxes 120 are connected via the network 210.

The host server 100H executes one or a plurality of applications 300. The application 300 is a program that uses a volume 310 provided by the node server 100N.

The node server 100N executes a storage controller 320. The storage controller 320 is a program that controls the storage function of the node server 100N, and provides the volume 310, which is a logical volume, to the host server 100H using the drive of the drive box 120. The storage controller 320 has the ownership of the volume 310, the ownership of the data area of the volume 310, and the ownership of the data area of the drive box 120.

The volume 310 is a data area used by the application 300. The I/O processing executed from the application 300 to the volume 310 is performed by the storage controller 320 of the node server 100N. Management of a logical area of the volume 310 and a physical area corresponding to the logical area is performed by the storage controller 320.

The drive box 120 executes a drive box controller which is a program for controlling the drive box. The drive box controller receives an I/O request from the storage controller 320, executes I/O with respect to the target drive 121, and returns a result.

Figure 4:
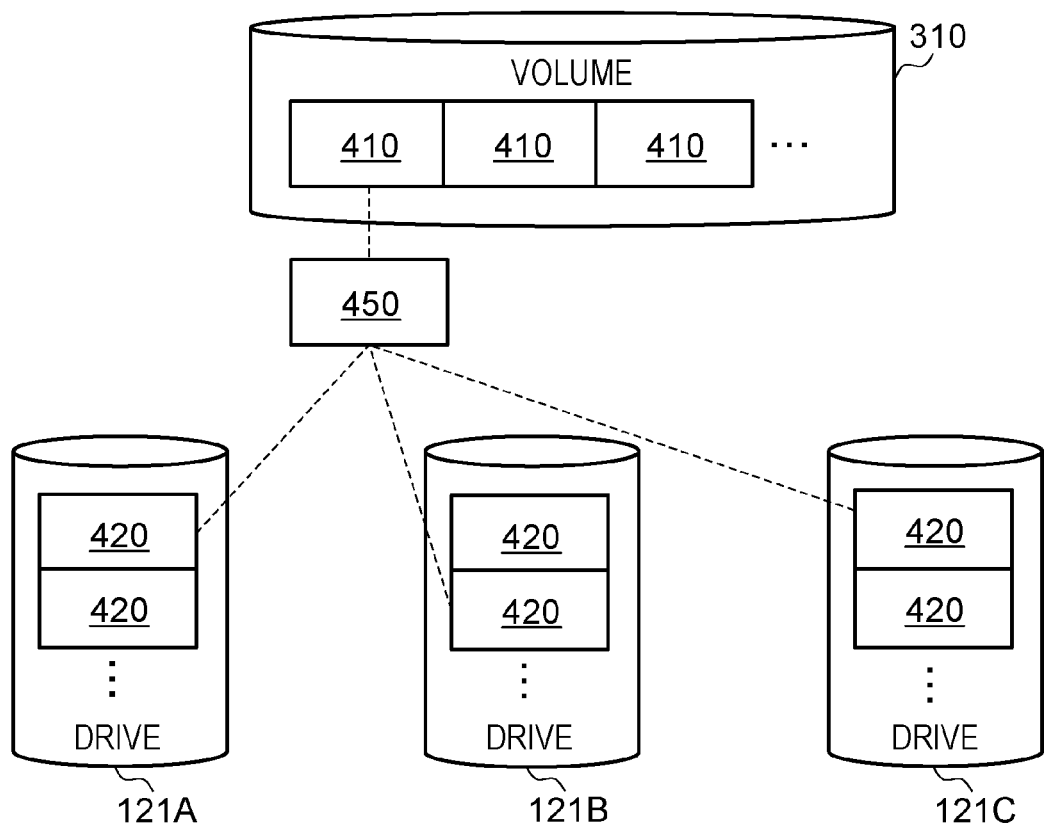
FIG. 4 is an explanatory diagram of block mapping.

FIG. 4 is an explanatory diagram of block mapping. Block mapping 450 is metadata for managing a mapping relationship between a logical area 410 of the volume 310 and a physical area 420 of the drive 121.

One logical area 410 corresponds to one or more physical areas 420. Each physical area 420 has the same size as the corresponding logical area 410.

For data protection, basically, the logical area 410 corresponds to two or more physical areas 420, and each physical area 420 is selected from different drives 121.

A method of managing the physical area 420 is determined according to a data protection scheme set in units of volumes. As the data protection scheme, for example, replication in which the same duplicated data as the write data is used as redundant data, or Erasure Coding in which a mathematical function is applied to the write data to generate redundant data is assumed.

When the data protection scheme is replication, the same value is replicated and stored in each physical area 420 corresponding to the logical area 410. This is a so-called mirroring.

When the data protection scheme is erasure coding, each physical area 420 corresponding to one logical area 410 is managed as a parity group.

The parity group includes physical areas of the total number of the number of pieces of data and redundancies (the number of parities) of a data protection setting, and each physical area is selected from different storage devices.

For example, in the case of 2D1P (number of pieces of data: 2, number of parities: 1), the parity group includes three physical areas.

Data and parity may be stored by striping the inside of the logical area 410 as in RAID 5/6.

The logical area 410 may have a variable length or a fixed length. A size of the physical area 420 is determined according to the data protection setting of the volume and a size of the logical area. The logical area 410 may be secured by a method of securing the physical area 420 when there is a first write (thin provisioning) or a method of securing the entire logical area in advance.

Figure 5:
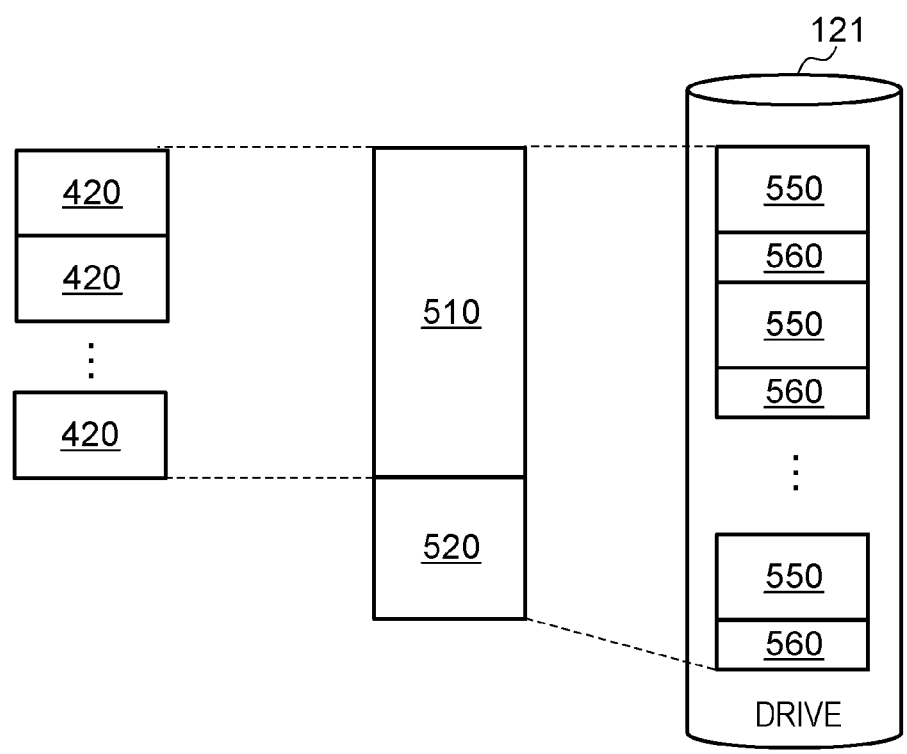
FIG. 5 is an explanatory diagram of a layout of a drive.

FIG. 5 is an explanatory diagram of a layout of a drive. As illustrated in FIG. 5, the drive 121 includes an area in which sets of a corresponding data area 550 and a guarantee code area 560 are alternately continuous.

The data area 550 is an area for storing data in a user data area 510 and a metadata area 520, and corresponds to a sector, for example.

The guarantee code area 560 is an area for detecting data garbling or the like of the corresponding data area 550, and is an area for storing a so-called data integrity field (DIF).

In the present embodiment, when the set of the data area 550 and the guarantee code area 560 is continuous as disclosed, reading or writing of the data and the guarantee code can be performed by one read or write.

In the case of a drive having no guarantee code area, it is necessary to write data and a guarantee code in different discontinuous areas, and it is necessary to read or write the data and the guarantee code twice in total once in one read or write, so that the number of reads/writes is greatly reduced by adopting the disclosed configuration.

The user data area 510 is an area for storing the physical area 420.

The metadata area 520 is an area for storing table information held in a memory of the storage controller or the drive box controller or journal data used in write processing of the storage controller.

A usage status of the user data area 510 and the metadata area 520 is managed by the storage controller.

Figure 6:
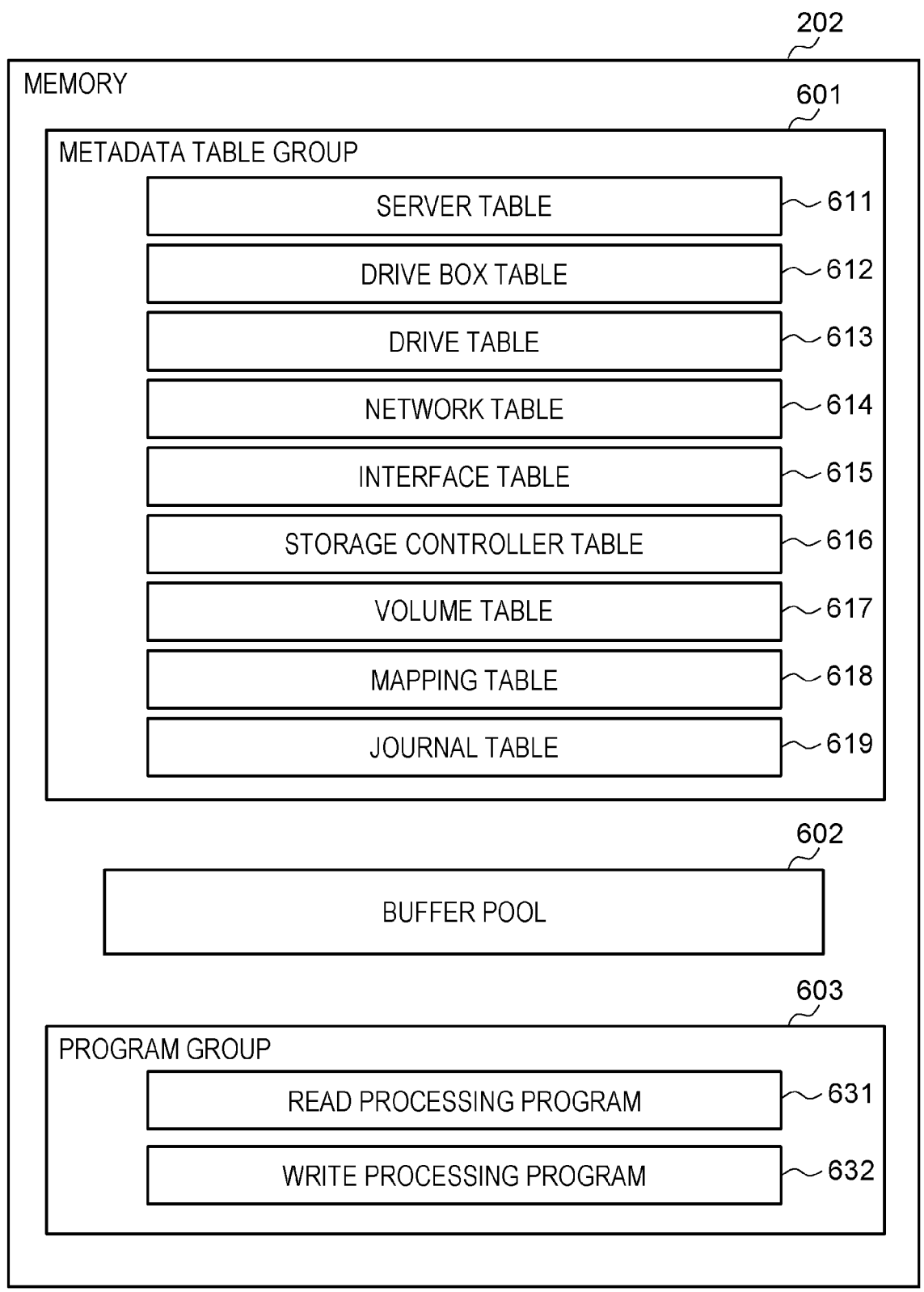
FIG. 6 is a memory configuration of a server in which a storage controller operates.

FIG. 6 is a memory configuration of a server in which the storage controller operates. As illustrated in FIG. 6, a metadata table group 601, a buffer pool 602, and a program group 603 are stored in the memory 202 of the node server 100N in which the storage controller 320 operates.

The metadata table has a replica in the metadata area of the storage device. The metadata table group 601 includes a server table 611, a drive box table 612, a drive table 613, a network table 614, an interface table 615, a storage controller table 616, a volume table 617, a mapping table 618, and a journal table 619. Details of the metadata table will be described later.

The buffer pool 602 is an area for securing a temporary buffer used for the I/O processing.

The program group 603 includes a read processing program 631 and a write processing program 632.

Figure 7:
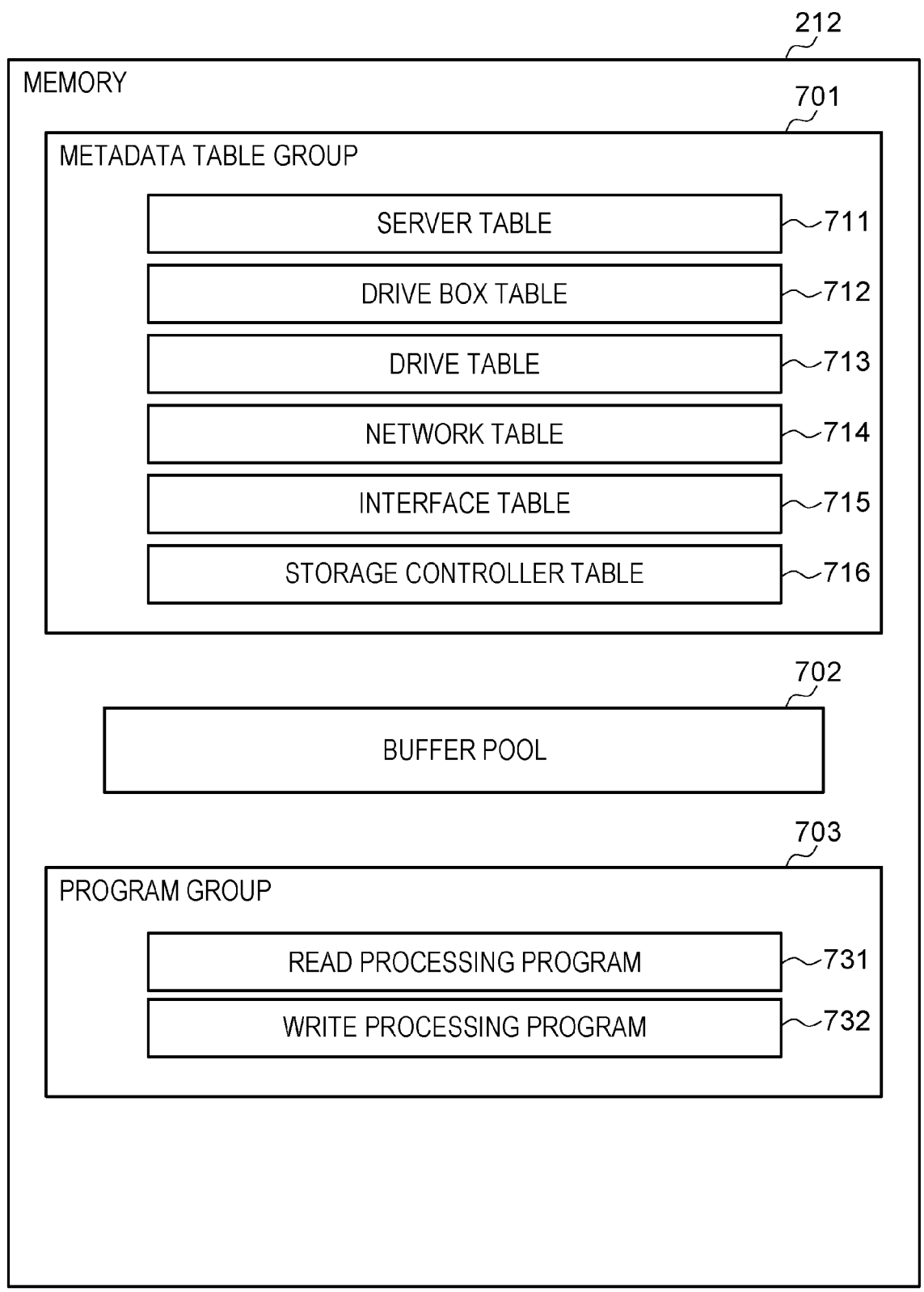
FIG. 7 is a memory configuration of a server in which a drive box controller operates.

FIG. 7 is a memory configuration of a server in which the drive box controller operates. As illustrated in FIG. 7, a metadata table group 701, a buffer pool 702, and a program group 703 are stored in the memory 212 of the drive box 120 in which the drive box controller operates.

The metadata table has a replica in the metadata area of the storage device. The metadata table group 701 includes a server table 711, a drive box table 712, a drive table 713, a network table 714, an interface table 715, and a storage controller table 716.

Details of the metadata table will be described later.

The buffer pool 702 is an area for securing a temporary buffer used for the I/O processing.

The program group 703 includes a read processing program 731 and a write processing program 732.

Figure 8:
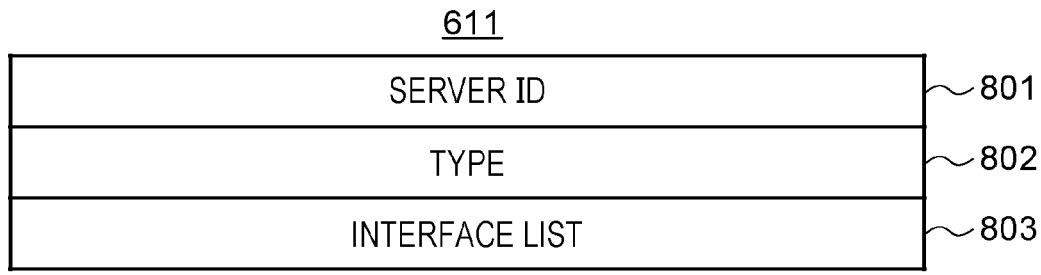
FIG. 8 is an explanatory diagram of a server table.

FIG. 8 is an explanatory diagram of the server table 611. The server table 611 indicates information for each server, and includes items of a server ID 801, a type 802, and an interface list 803.

The server ID 801 indicates an ID of the server.

The type 802 takes a value of either the host or the storage node.

The interface list 803 is a list of IDs of network I/F information mounted on the server.

Figure 9:
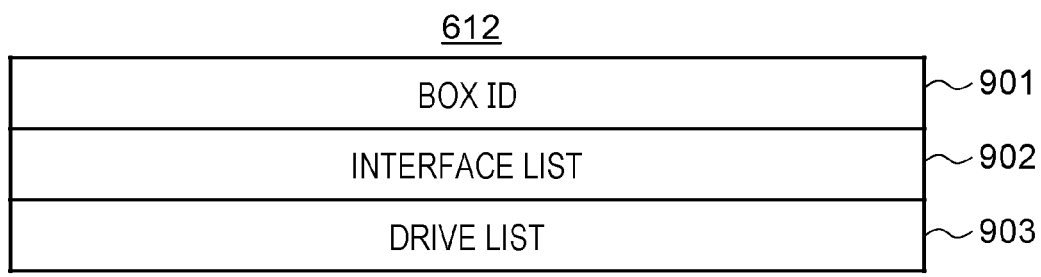
FIG. 9 is an explanatory diagram of a drive box table.

FIG. 9 is an explanatory diagram of the drive box table 612. The drive box table 612 indicates information for each drive box, and includes items of a box ID 901, an interface list 902, and a drive list 903.

The box ID 901 indicates an ID of the drive box.

The interface list 902 is a list of IDs of network I/F information mounted on the drive box.

The drive list 903 is a list of IDs of drives mounted in the drive box.

Figure 10:
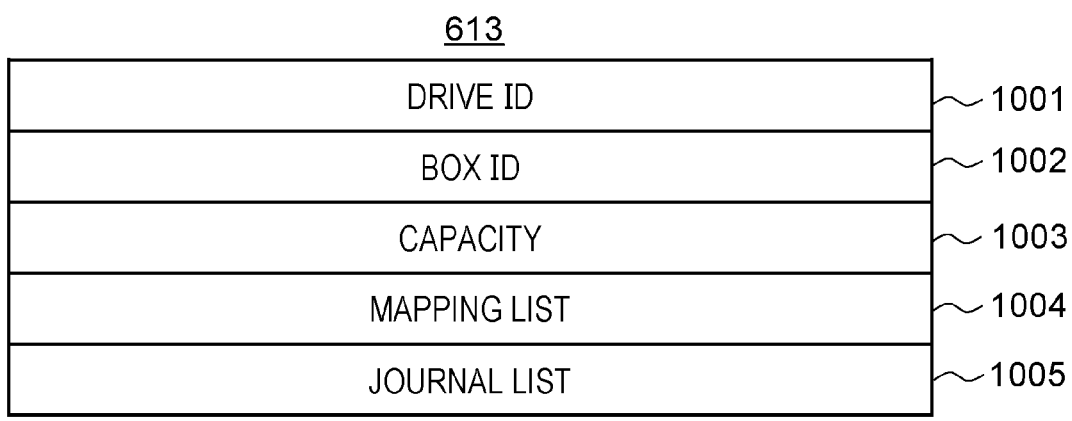
FIG. 10 is an explanatory diagram of a drive table.

FIG. 10 is an explanatory diagram of the drive table 613. The drive table 613 indicates information for each drive, and includes items of a drive ID 1001, a box ID 1002, a capacity 1003, a mapping list 1004, and a journal list 1005.

The drive ID 1001 indicates an ID of the drive.

The box ID 1002 indicates an ID of a drive box in which the drive is mounted.

The capacity 1003 indicates the maximum capacity of the drive.

The mapping list 1004 is a list of IDs of block mapping information assigned to the drive.

The journal list 1005 is a list of IDs of journal information assigned to the drive.

Figure 11:
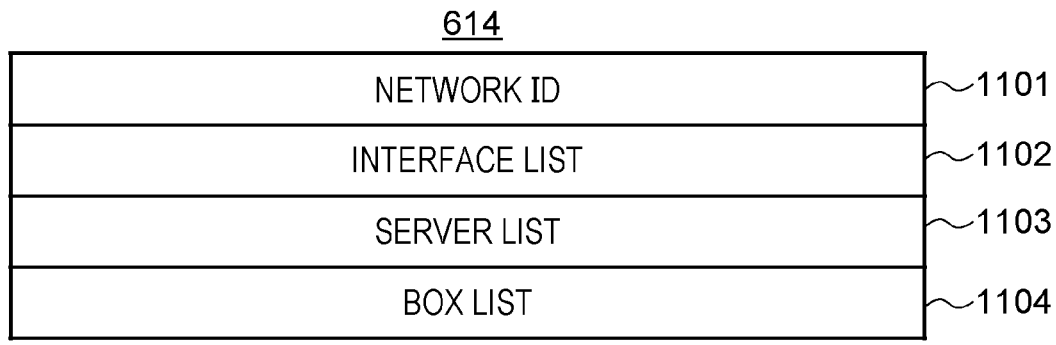
FIG. 11 is an explanatory diagram of a network table.

FIG. 11 is an explanatory diagram of the network table 614. The network table 614 indicates information for each network, and includes items of a network ID 1101, an interface list 1102, a server list 1103, and a box list 1104.

The network ID 1101 indicates an ID of the network.

The interface list 1102 is a list of IDs of network I/F information mounted on the network.

The server list 1103 is a list of IDs of servers connected to the network.

The box list 1104 is a list of IDs of drive boxes connected to the network.

Figure 12:
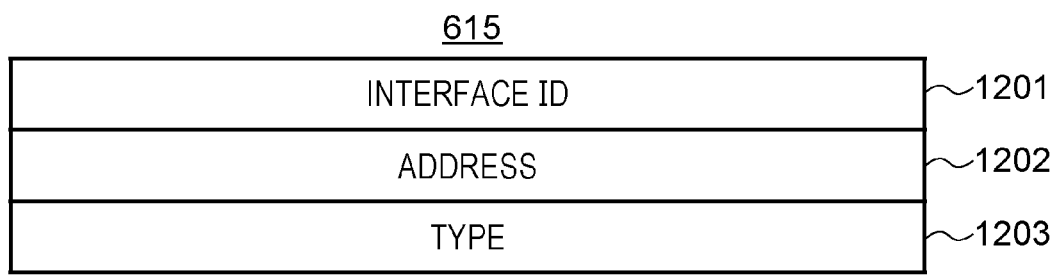
FIG. 12 is an explanatory diagram of an interface table.

FIG. 12 is an explanatory diagram of the interface table 615. The interface table 615 indicates information for each network I/F, and includes items of an interface ID 1201, an address 1202, and a type 1203.

The interface ID 1201 indicates an ID of the network I/F.

The address 1202 is an address assigned to the network I/F, and is, for example, an IP address or the like.

The type 1203 is a type of the network I/F, and is, for example, Ethernet, FC, or the like.

Figure 13:
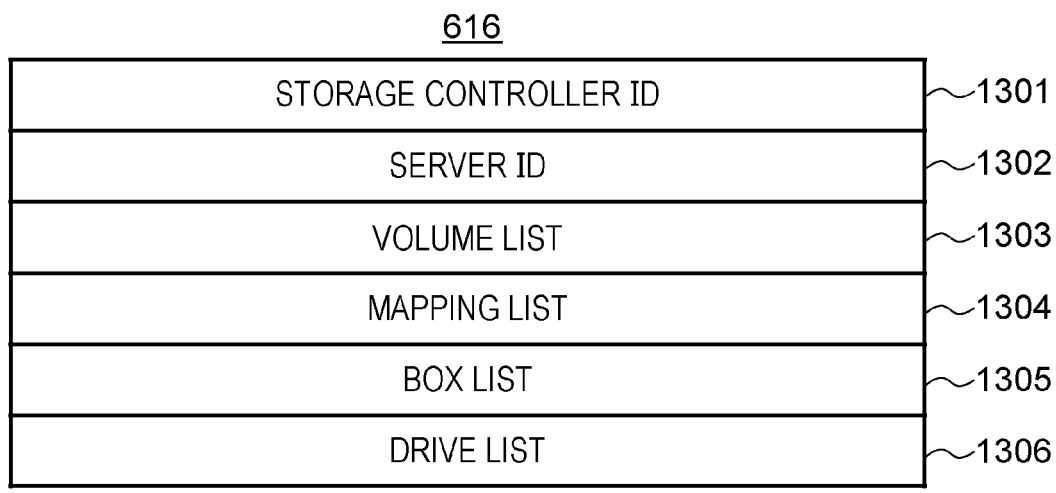
FIG. 13 is an explanatory diagram of a storage controller table.

FIG. 13 is an explanatory diagram of the storage controller table 616. The storage controller table 616 indicates information for each storage controller, and includes items of a storage controller ID 1301, a server ID 1302, a volume list 1303, a mapping list 1304, a box list 1305, and a drive list 1306.

The storage controller ID 1301 indicates an ID of the storage controller.

The server ID 1302 indicates an ID of a server on which the storage controller operates.

The volume list 1303 indicates a list of IDs of volumes managed by the storage controller.

The mapping list 1304 indicates a list of IDs of block mapping managed by the storage controller.

The box list 1305 indicates a list of IDs of drive boxes to which the storage controller is connected.

The drive list 1306 indicates a list of IDs of drives to which the storage controller is connected.

FIG. 14 is an explanatory diagram of the volume table 617. The volume table 617 indicates information for each volume, and includes items of a volume ID 1401, a storage controller ID 1402, a server ID 1403, a data protection setting 1404, and a mapping list 1405.

The volume ID 1401 indicates an ID of the volume.

The storage controller ID 1402 indicates an ID of a storage controller that manages the volume.

The server ID 1403 indicates an ID of a host server using the volume.

The data protection setting 1404 indicates the data protection setting of the volume. The data protection setting is, for example, replication (2 redundancy, 3 redundancy . . . ), Erasure Coding (M data, N parity), or the like.

The mapping list 1405 indicates a list of IDs of block mappings corresponding to logical areas of the volume.

FIG. 15 is an explanatory diagram of the mapping table 618. The mapping table 618 indicates information for each block mapping, and includes items of a mapping ID 1501, a tuple 1502, a tuple list 1503, and a lock status 1504.

The mapping ID 1501 indicates an ID of the block mapping.

The tuple 1502 indicates a volume ID, a start address of the logical area, and a size of the logical area as information regarding the logical area of the volume corresponding to the block mapping.

The tuple list 1503 indicates a list of a storage device ID, a start address of the physical area, a size of the physical area, and a number of the data protection as information regarding the physical area corresponding to the block mapping.

The lock status 1504 indicates a lock state of the block mapping.

FIG. 16 is an explanatory diagram of the journal table 619. The journal table 619 indicates information for each journal, and includes items of a journal ID 1601, a status 1602, a tuple 1603, a mapping ID 1604, a data list 1605, a link journal list 1606, and a commit flag 1607.

The journal ID 1601 indicates an ID of the journal.

The status 1602 indicates whether the journal area is in use or free.

In a case where the journal is in use, the tuple 1603 indicates the storage controller ID and the sequence number in order to specify the order of the journal processing of which storage controller.

The mapping ID 1604 indicates an ID of block mapping information during write processing corresponding to the journal.

The data list 1605 is an area for storing data and parity during write processing.

The link journal list 1606 is an area in which a relation among a plurality of journal areas is recorded in order to perform processing by connecting the journal areas when the data size of the I/O processing is large.

The commit flag 1607 is an area for writing commit processing.

Figure 17:
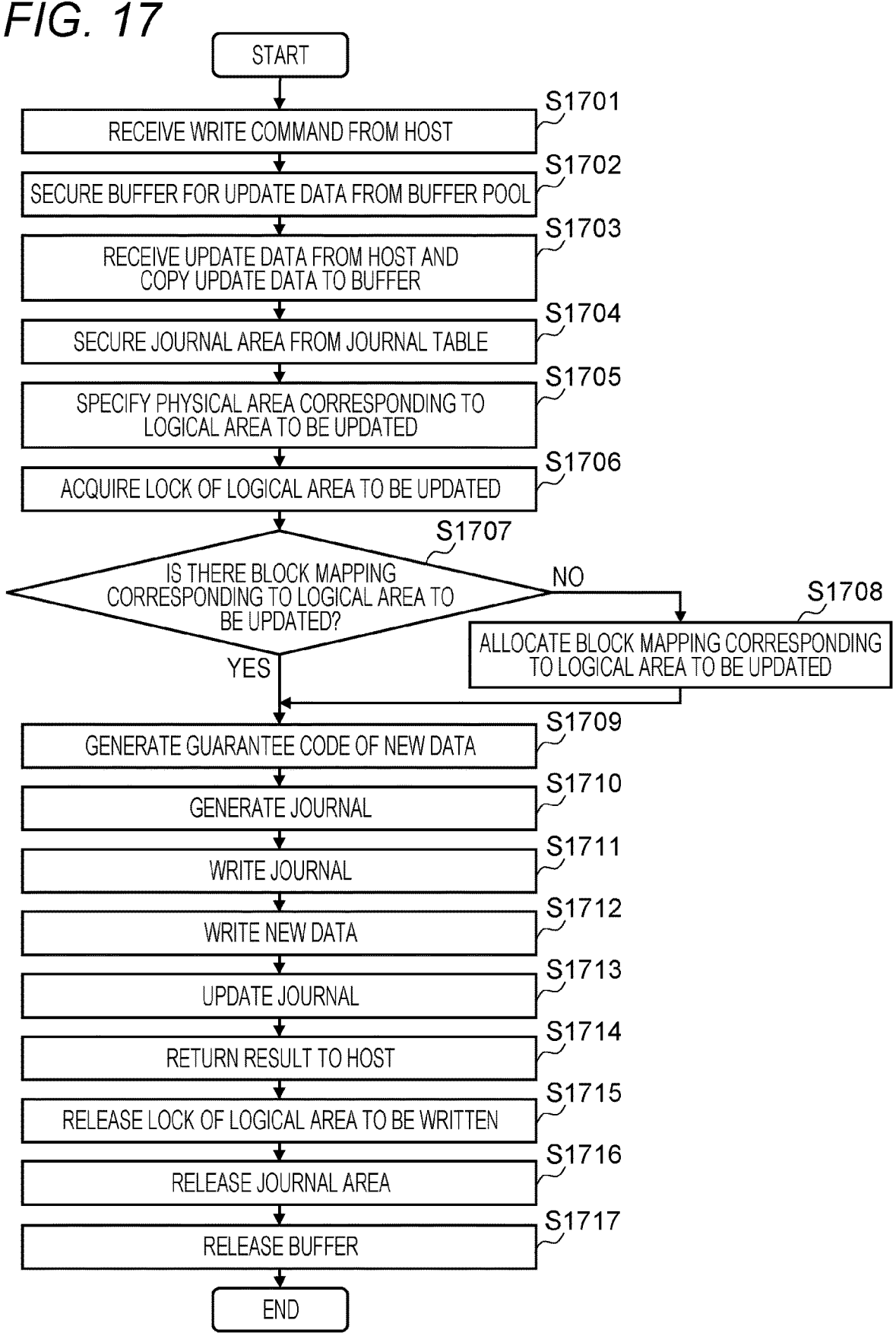
FIG. 17 is a flowchart illustrating a procedure of write processing of a storage controller adopting replication.

FIG. 17 is a flowchart illustrating a procedure of write processing of the storage controller adopting replication. The storage controller adopting the replication sequentially executes the following Steps S1701 to S1717 in the write processing.

Step S1701: The storage controller receives the write command from the host server 100H, and proceeds to Step S1702. The write command includes a volume ID, a head address of the logical area to be updated, and an update size. For example, the volume ID is LUN or the like, and the address is LBA.

Step S1702: The storage controller secures a buffer for update data from the buffer pool 602, and proceeds to Step S1703.

Step S1703: The storage controller receives the update data from the host server 100H, copies the update data to the buffer, and proceeds to Step S1704.

Step S1704: The storage controller secures the journal area from the journal table 619, and proceeds to Step S1706. Specifically, the storage controller searches for an entry on the journal table 619 and secures a journal area in a free state.

Step S1705: The storage controller specifies a physical area corresponding to the logical area to be updated, and proceeds to Step S1706. Specifically, the storage controller performs the following processing.

1. Volume information corresponding to the volume ID acquired by the write command is acquired from the volume table 617.

2. Block mapping information corresponding to a section of the head address and the update size of the logical area to be updated is acquired from the list of the block mapping information of the volume information. (In a case where the section is wide, there is a case where a plurality of pieces of block mapping information is targeted.)

3. Information (drive ID, head address, size) of the corresponding physical area is acquired from each block mapping information.

Step S1706: The storage controller acquires the lock of the logical area to be updated, and proceeds to Step S1707. Specifically, the storage controller changes the lock state of the block mapping information corresponding to the logical area to be updated to lock.

Step S1707: The storage controller determines whether there is block mapping corresponding to the logical area to be updated. If block mapping is present (Yes), the process proceeds to Step S1709. If not (No), the process proceeds to Step S1708.

Step S1708: The storage controller newly allocates block mapping, and proceeds to Step S1709. The block mapping is allocated when the data protection scheme of the volume of the logical area is replication by referring to the drive table 613, searching for a free physical area from drives having different designated redundancies, creating block mapping information for mapping the found free physical area and the logical area, and adding the block mapping information to the mapping table 618.

The mapping list 1004 in the drive table 613 is searched for the free physical area of the drive, and the physical area that is not used by the entire list is the free area.

Step S1709: The storage controller generates a guarantee code of new data, and proceeds to Step S1710. The guarantee code may include a checksum for detecting data garbling, storage device information (ID) of a storage destination of data, and the like. As a checksum, for example, CRC or the like can be used.

Step S1710: The storage controller generates a journal, and proceeds to Step S1711. The journal is data to be used for returning to a state of old data when the update of the new data fails or the like. For example, the journal stores a header and old data. The header includes a sequence number of the journal, a drive ID, a head address of an update destination, a data size, a guarantee code, and the like. In addition, a write status is set to Prepare.

Step S1711: The storage controller writes the journal, and proceeds to Step S1712. Specifically, the storage controller executes the write processing on the metadata area of the drive corresponding to the journal information secured in advance.

Step S1712: The storage controller writes new data. Here, a plurality of write processing are executed in parallel, and when all the processing is successful, the process proceeds to the next Step S1713. If it fails, an error response is made.

Step S1713: The storage controller updates the journal, and proceeds to Step S1714. Specifically, Commit is written in the commit flag 1607 of the journal written in the metadata area, and the write processing is completed.

Step S1714: The storage controller returns the result to the host server 100H, and proceeds to Step S1715. In the present embodiment, the write-through method is adopted, and write completion is responded to the host server 100H after completion of writing to the drive.

Step S1715: The storage controller releases the lock of the logical area to be written, and proceeds to Step S1716.

Step S1716: The storage controller releases the journal area, and proceeds to Step S1717.

Step S1717: The storage controller releases the buffer and ends the process.

Figure 18:
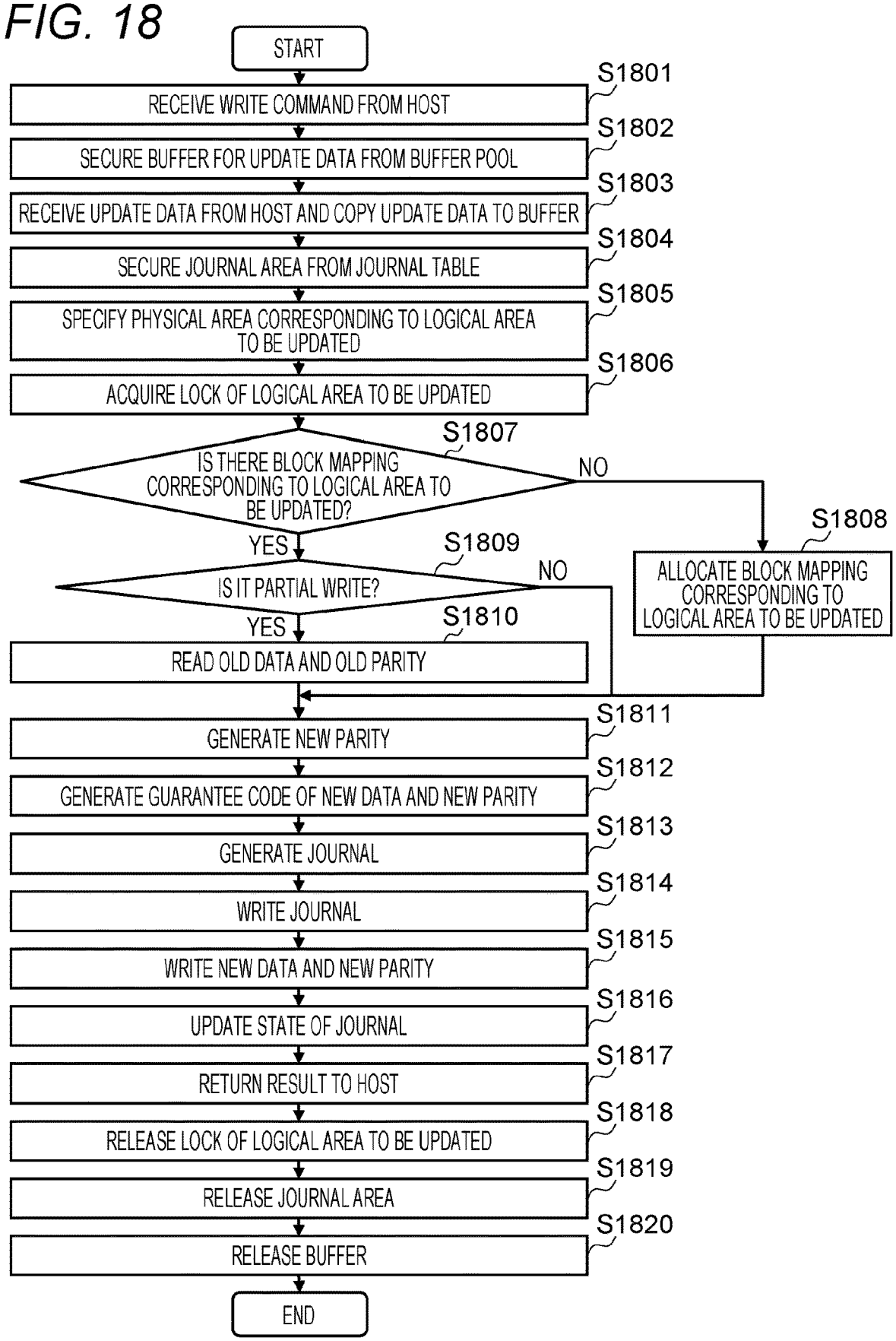
FIG. 18 is a flowchart illustrating a procedure of write processing of a storage controller adopting Erasure Coding.

FIG. 18 is a flowchart illustrating a procedure of write processing of the storage controller adopting Erasure Coding. The storage controller adopting Erasure Coding sequentially executes the next Steps S1801 to S1820 in the write processing.

Step S1801: The storage controller receives the write command from the host server 100H, and proceeds to Step S1802. The write command includes a volume ID, a head address of the logical area to be updated, and an update size. For example, the volume ID is LUN or the like, and the address is LBA.

Step S1802: The storage controller secures a buffer for update data from the buffer pool 602, and proceeds to Step S1803.

Step S1803: The storage controller receives the update data from the host server 100H, copies the update data to the buffer, and proceeds to Step S1804.

Step S1804: The storage controller secures the journal area from the journal table 619, and proceeds to Step S1806. Specifically, the storage controller searches for an entry on the journal table 619 and secures a journal area in a free state.

Step S1805: The storage controller specifies a physical area corresponding to the logical area to be updated, and proceeds to Step S1806. Specifically, the storage controller performs the following processing.

1. The volume information corresponding to the volume ID acquired by the write command is acquired from the volume table 617.

2. Block mapping information corresponding to a section of the head address and the update size of the logical area to be updated is acquired from the list of the block mapping information of the volume information. (In a case where the section is wide, there is a case where a plurality of pieces of block mapping information is targeted.)

3. Information (drive ID, head address, size) of the corresponding physical area is acquired from each block mapping information.

Step S1806: The storage controller acquires the lock of the logical area to be updated, and proceeds to Step S1807. Specifically, the storage controller changes the lock state of the block mapping information corresponding to the logical area to be updated to lock.

Step S1807: The storage controller determines whether there is block mapping corresponding to the logical area to be updated. If block mapping is present (Yes), the process proceeds to Step S1809. If not, the process proceeds to Step S1808.

Step S1808: The storage controller newly allocates block mapping, and proceeds to Step S1811.

Step S1809: The storage controller determines whether it is a partial write. If it is the partial write (Yes), the process proceeds to Step S1810. If it is not the partial write (No), the process proceeds to Step S1811. In the case of Erasure Coding, the time when the logical area to be updated includes the entire physical area for generating the parity is referred to as a full stripe write, and the other time is referred to as a partial write.

In the case of the full stripe write, since an update parity (new parity) can be generated from the update data (new data), it is not necessary to read the old data (update source data) and an old parity.

On the other hand, in the case of the partial write, the new parity is generated by XOR processing for generating the new parity using the old data, the old parity, and the new data as inputs.

Step S1810: The storage controller reads the old data and the old parity, and proceeds to Step S1811. As described above, in the case of the partial write by the Erasure Coding, the old parity (the parity before the update) is required in addition to the old data (the data before the update) at the time of generating the journal, and thus, the data is read.

Step S1811: The storage controller generates a new parity and proceeds to Step S1812. As described above, a method of generating a new parity is different between the case of the full stripe write and the case of the partial write.

Step S1812: The storage controller generates a guarantee code of the new data and the new parity, and proceeds to Step S1813. In the case of Erasure Coding, it is also necessary to generate the guarantee code of the new parity.

Step S1813: The storage controller generates a journal, and proceeds to Step S1814. The journal is data used to return to the state of the old data and the old parity when the update of the new data and the new parity fails.

For example, the journal stores a header and old data or old parity.

The header includes a sequence number of the journal, a drive ID, a head address of an update destination, a data size, a guarantee code, and the like.

Step S1814: The storage controller writes the journal, and proceeds to Step S1815. Specifically, the storage controller executes the write processing on the metadata area of the drive corresponding to the journal information secured in advance.

Step S1815: The storage controller writes the new data and the new parity. Specifically, all the new data and all the new parities are written in parallel, and when all the processing is successful, the process proceeds to Step S1816. If it fails, an error response is made.

Step S1816: The storage controller updates the state of the journal, and proceeds to Step S1817. Specifically, Commit is written in the commit flag 1607 of the journal written in the metadata area, and the write processing is completed.

Step S1817: The storage controller returns the result to the host server 100H, and proceeds to Step S1818.

Step S1818: The storage controller releases the lock of the logical area to be updated, and proceeds to Step S1819.

Step S1819: The storage controller releases the journal area, and proceeds to Step S1820.

Step S1829: The storage controller releases the buffer and ends the process.

Figure 19:
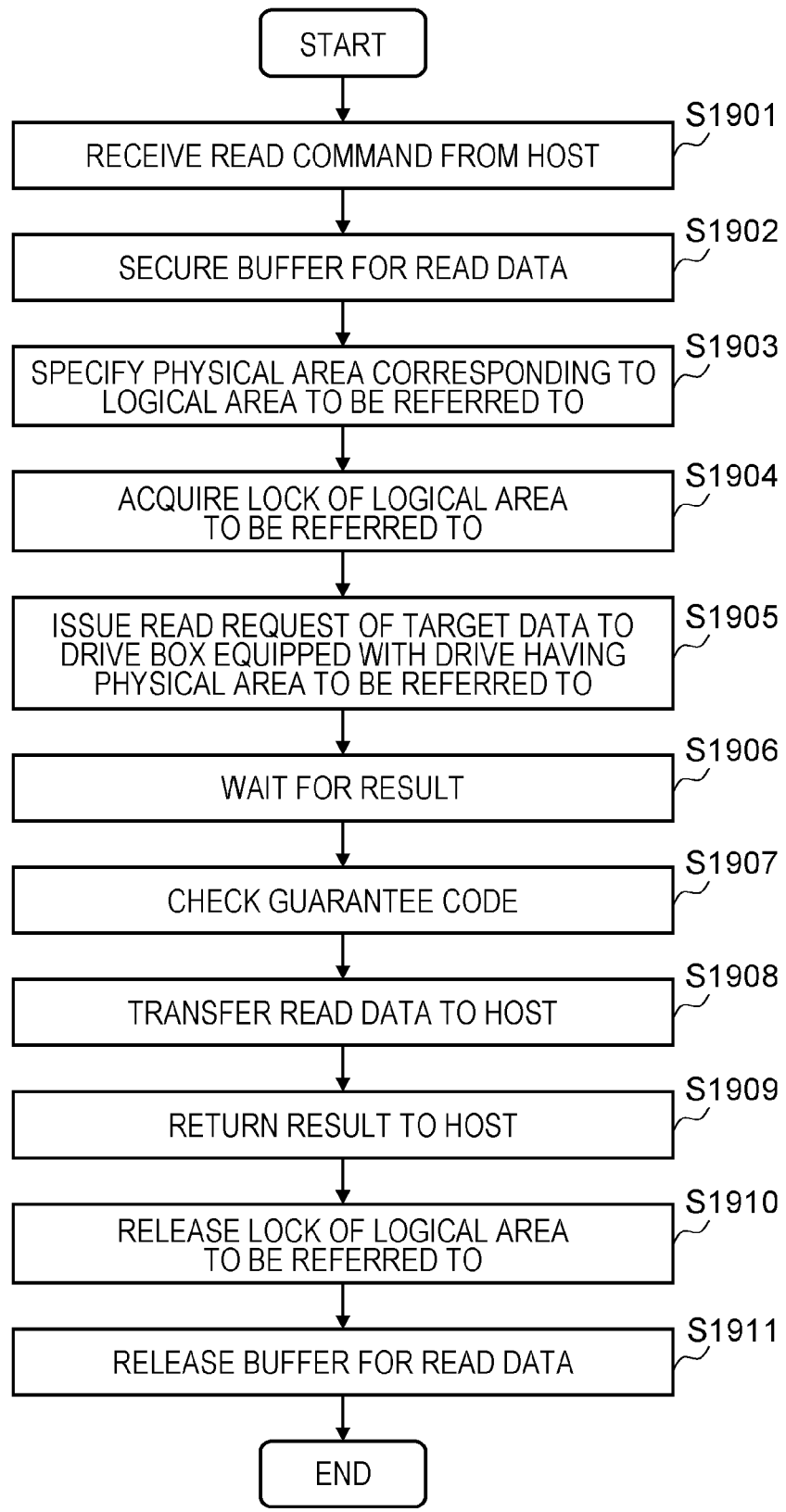
FIG. 19 is a flowchart illustrating a procedure of read processing of the storage controller.

FIG. 19 is a flowchart illustrating a procedure of read processing of the storage controller. The read processing of the storage controller is similar in both the case of adopting the replication and the case of adopting the Erasure Coding, and the storage controller sequentially executes the next Steps S1901 to S1911.

Step S1901: The storage controller receives a read command from the host server 100H, and proceeds to Step S1902.

Step S1902: The storage controller secures a read buffer, and proceeds to Step S1903.

Step S1903: The storage controller specifies a physical area corresponding to the logical area to be referred to, and proceeds to Step S1904.

Step S1904: The storage controller acquires the lock of the logical area to be referred to, and proceeds to Step S1905.

Step S1905: The storage controller issues a read request of the target data to the drive box equipped with the drive having the physical area to be referred to, and proceeds to Step S1906.

Step S1906: The storage controller waits for a result of the issued read request, and proceeds to Step S1907.

Step S1907: The storage controller checks the guarantee code for the result of the read request, and proceeds to Step S1908.

Step S1908: The storage controller transfers the read data to the host server 100H, and proceeds to Step S1909.

Step S1909: The storage controller returns the result to the host server 100H, and proceeds to Step S1910.

Step S1910: The storage controller releases the lock of the logical area to be referred to, and proceeds to Step S1911.

Step S1911: The storage controller releases the buffer for the read data and ends the process.

Figure 20:
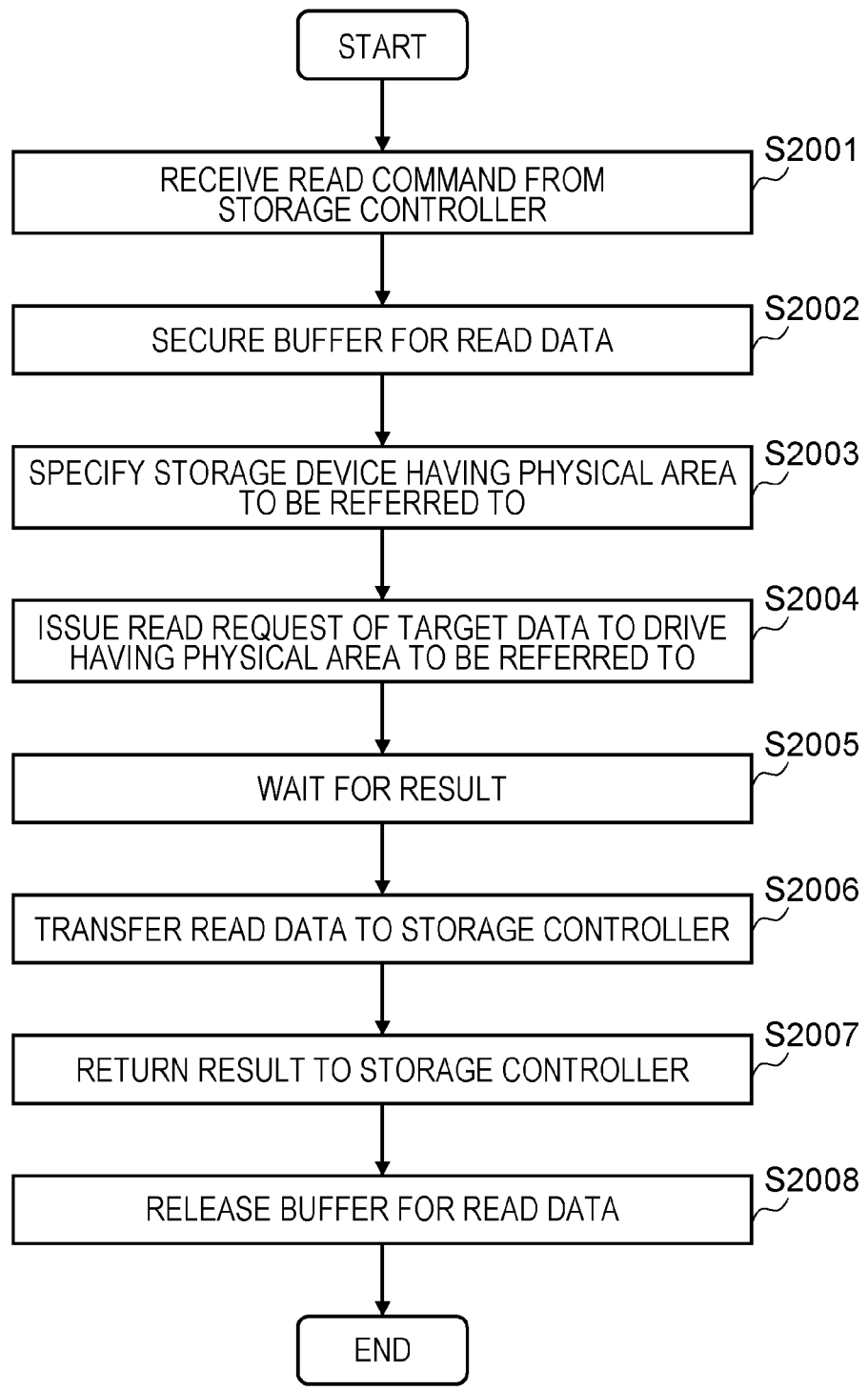
FIG. 20 is a flowchart illustrating a procedure of read processing of a drive box.

FIG. 20 is a flowchart illustrating a procedure of read processing of the drive box. The drive box sequentially executes the next Steps S2001 to S2008 in the read processing.

Step S2001: The drive box receives the read command from the storage controller, and proceeds to Step S2002.

Step S2002: The drive box secures a buffer for read data, and proceeds to Step S2003.

Step S2003: The drive box specifies a drive having a physical area to be referred to, and proceeds to Step S2004.

Step S2004: The drive box issues a read request of the target data to the drive having the physical area to be referred to, and proceeds to Step S2005.

Step S2005: The drive box waits for the result of the issued read request, and proceeds to Step S2006.

Step S2006: The drive box transfers the read data to the storage controller, and proceeds to Step S2007.

Step S2007: The drive box returns the result to the storage controller, and proceeds to Step S2008.

Step S2008: The drive box releases the buffer for the read data and ends the process.

Figure 21:
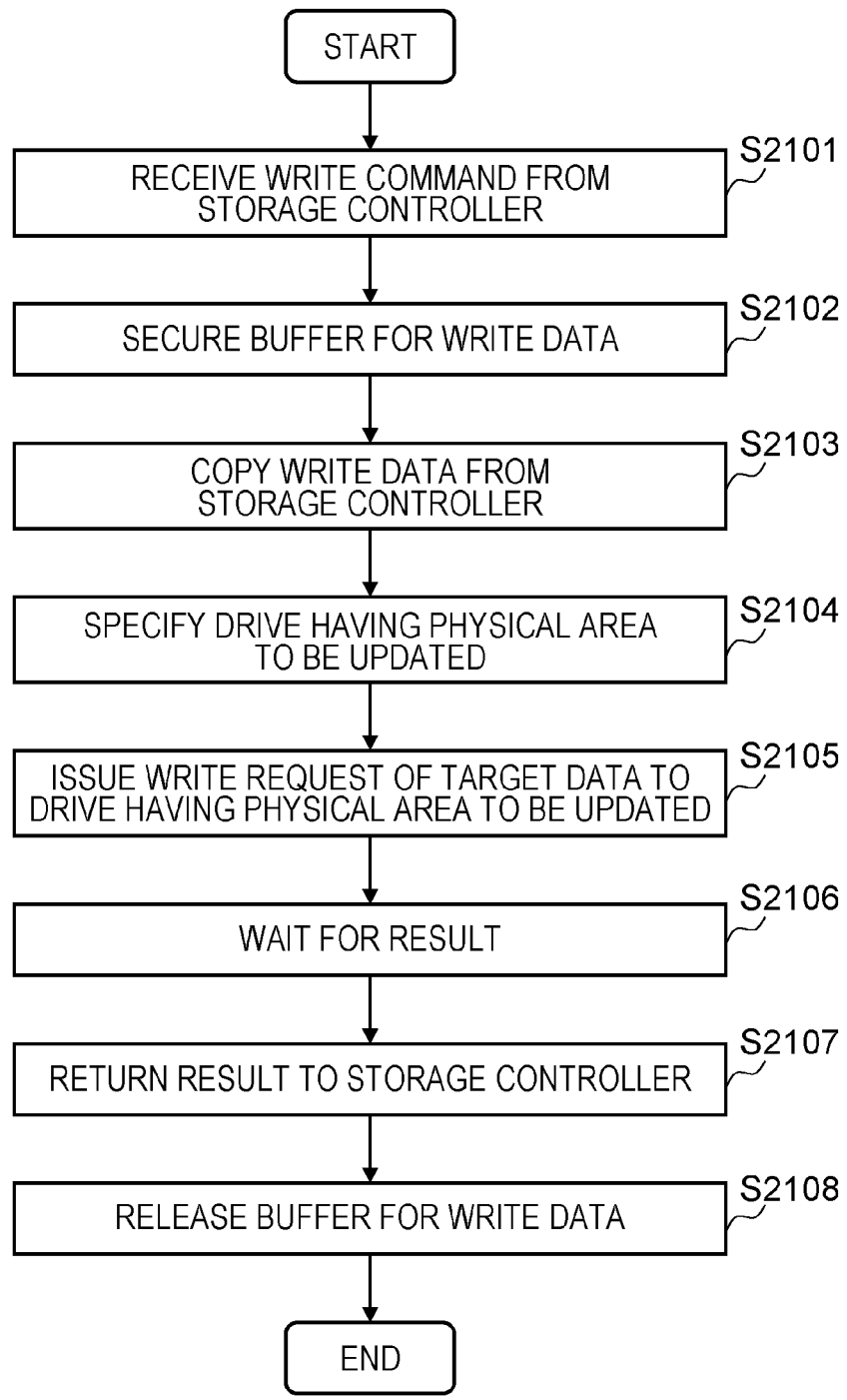
FIG. 21 is a flowchart illustrating a procedure of write processing of the drive box.

FIG. 21 is a flowchart illustrating a procedure of write processing of the drive box. The drive box sequentially executes the next Steps S2101 to S2108 in the write processing.

Step S2101: The drive box receives a write command from the storage controller, and proceeds to Step S2102.

Step S2102: The drive box secures a buffer for write data, and proceeds to Step S2103.

Step S2103: The drive box copies the write data from the storage controller, and proceeds to Step S2104.

Step S2104: The drive box specifies a drive having a physical area to be updated, and proceeds to Step S2105.

Step S2105: The drive box issues a write request of the target data to the drive having the physical area to be updated, and proceeds to Step S2106.

Step S2106: The drive box waits for a result of the issued write request, and proceeds to Step S2107.

Step S2107: The drive box returns the result to the storage controller, and proceeds to Step S2108.

Step S2108: The drive box releases the buffer for the read data and ends the process.

Next, an operation example of the storage controller will be described. The storage controller generates the guarantee data for the write data and writes the write data and the guarantee data in a continuous area of the drive 121. Therefore, when the write data received from the host server 100H is held in the buffer pool 602 which is a temporary storage area, a free area for holding the guarantee code is provided in advance, and thereafter, the guarantee code is generated from the write data and held in the free area. According to such control, a state in which the write data and the guarantee data are continuous can be configured by only writing the write data and the guarantee code in the buffer pool 602 once, and the write data and the guarantee data of the buffer pool 602 can be written to the drive 121 as they are.

As described above, the distributed storage system of the disclosure includes the drive box 120 that is one or a plurality of storage units including a plurality of physical storage devices, and the node server 100N that is a plurality of computers connected to the one or the plurality of storage units via the communication network. When receiving a write request for a logical volume, the computer writes write data corresponding to the write request and redundant data for making the write data redundant in a plurality of physical storage devices of the storage unit in a distributed manner, and collectively controls writing of a journal of write data for managing a write history of the write data and a journal of redundant data for managing a write history of the redundant data.

With such a configuration and operation, it is possible to reduce a network load related to writing of write data and redundant data.

Further, when receiving the write request, the computer generates a guarantee code for confirming that the write data does not change until the write data is read, and writes the write data and the corresponding guarantee code in a continuous area in the physical storage device.

With such an operation, it is possible to reduce a network load related to writing of the guarantee code.

Further, when holding the write data in the temporary storage area, the computer provides a free area for holding the guarantee code, generates a corresponding guarantee code from the write data held in the temporary storage area and holds the same in the free area, and writes the write data and the guarantee code held in the temporary storage area in the physical storage device.

According to this operation, it is possible to improve the efficiency when the computer processes the write data and the guarantee data.

In addition, the distributed storage system according to the disclosure makes a response of write completion to a request source of the write request after completion of writing of the journal of the write data and the journal of the redundant data, and when a failure occurs in the computer, another computer can take over a role of the computer in which the failure occurs using the write data, the redundant data, the journal of the write data, and the journal of the redundant data stored in the storage unit.

Here, the computer may be configured to set, as the redundant data, the same duplicated data as the write data.

Further, the computer may be configured to use erasure coding for applying a mathematical function to the write data to generate the redundant data.

Further, the present invention is not limited to the above embodiments, and various modifications may be contained. For example, the above embodiments have been described in detail for easy understanding of the present invention, and the present invention is not necessarily limited to those having all the configurations described. In addition, the configuration is not limited to the deletion, and the configuration can be replaced or added.

What is claimed is:

1. A distributed storage system comprising:
a plurality of storage units that each include a plurality of physical storage devices; and
a computer connected to the plurality of storage units via a communication network, wherein
when receiving a write request for a logical volume, the computer writes write data corresponding to the write request and redundant data for making the write data redundant in the plurality of storage units in a distributed manner, and collectively controls writing of a journal of write data for managing a write history of the write data and a journal of redundant data for managing a write history of the redundant data, and
when receiving the write request, the computer generates a guarantee code for confirming that the write data does not change until the write data is read, and writes the write data and a corresponding guarantee code in a continuous area in a respective physical storage device.

2. The distributed storage system according to claim 1, wherein
when holding the write data in a temporary storage area, the computer provides a free area for holding the guarantee code, generates the corresponding guarantee code from the write data held in the temporary storage area and holds the same in the free area, and writes the write data and the guarantee code held in the temporary storage area in the respective physical storage device.

3. The distributed storage system according to claim 1, wherein
a response of write completion to a request source of the write request is made after completion of writing of the journal of the write data and the journal of the redundant data, and
when a failure occurs in the computer, a second computer takes over a role of the computer in which the failure occurs using the write data, the redundant data, the journal of the write data, and the journal of the redundant data.

4. The distributed storage system according to claim 1, wherein
the computer further sets, as the redundant data, a same duplicated data as the write data.

5. The distributed storage system according to claim 1, wherein
the computer uses erasure coding of applying a mathematical function to the write data to generate the redundant data.

6. A method for operating a plurality of storage units, the method comprising:
writing, when receiving a write request for a logical volume, write data corresponding to the write request and redundant data for making the write data redundant in the plurality of storage units in a distributed manner;
generating, when receiving the write request, a guarantee code for confirming that the write data does not change until the write data is read, and writes the write data and a corresponding guarantee code in a continuous area in a respective physical storage device; and
collectively controlling writing of a journal of write data for managing a write history of the write data and a journal of redundant data for managing a write history of the redundant data.

* * * * *